Patented Apr. 7, 1942

2,278,484

UNITED STATES PATENT OFFICE 2,278,484

GREEN AND YELLOW PEA

William J. Plews, Chicago, Ill., assignor to Food Manufacturing Corporation, a corporation of New York No Drawing. Application April 10, 1941, Serial No. 387,870

8 Claims. (Cl. 99—98)

The present invention relates to the treatment of green and yellow peas, and more particularly to the preparation of green and yellow pea powders.

It is among the objects of the present invention to provide an improved pea powder which will have enhanced edibility and digestibility and which may be converted substantially more readily into various types of liquid or paste compositions such as purees, soups, puddings, spreads, etc.

It is also among the objects of the present invention to provide a yellow pea or green pea powder which may be prepared so as to have some of the original raw pea taste and flavor characteristics, but particularly, which may be prepared in a precooked condition so as to have cooked pea taste and flavor characteristics.

Another object is to prepare a pea powder which very readily, and in many cases instantaneously, may be prepared into finished foods, such as soup, merely by adding to it various liquids as, for example, hot water.

Another object of the present invention is to prepare green or yellow pea powders which will have substantially improved water absorbency and water wettable quality.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing these objects the peas after harvesting, and generally after shelling or hulling, are dried either in the sun, or in a tray dryer, or by any other usual drying procedure. The drying temperature may range for example from around 90° F. or 100° F. to about 160° F. or 180° F., until the water content is reduced, for example, to less than about 15% to 20%, or less than 10% to 15%.

These peas, either whole, split, granulated, steel cut, or pulverized, etc., are then placed in a closed chamber in which they are subjected to an elevated pressure ranging, for example, from between about 20 or 25 pounds per square inch to about 300 pounds per square inch and at a temperature ranging for example between about 250° F. and 550° F., and for a time period ranging for instance, from 3 to 10 seconds, to 4 or 5 minutes, or longer, depending upon the results desired, and the equipment and other conditions that are used. During this procedure the chamber may or may not be rotated, as desired.

The chamber is then suddenly and instantaneously opened into a low pressure (preferably relatively unconfined) area, such as the atmosphere, whereupon the peas are ejected from the chamber and result in a structure disrupted or cell disrupted condition, with some expansion taking place, but generally without substantial disintegration, shattering or disruption of the unity of the peas.

The pressure and temperature may be obtained by introducing saturated or superheated steam into the chamber, or, if desired, the chamber may be externally heated, in which case steam may be admitted into the chamber, or, the moisture content of the peas may be so regulated so that the moisture from within the peas will generate the necessary pressure. For various modifications and results in carrying out this invention the steam may be moist or dry.

Also, various flavoring materials such as salt, for example, or other flavoring materials, either dry or liquid, may be admitted or placed in the chamber so as to become impregnated within the peas during this treatment.

In the treating of the peas to produce the pea powder in accord with this invention, the moisture content of the peas may be adjusted depending upon the explosion treatment that is utilized.

For example, when the peas are exploded by passing steam into the chamber, the moisture content of the peas may be 7% to 8% whereas, when the steam within the chamber is to be generated from the moisture within the peas themselves, the moisture content of the peas may be around 17%.

Example I

As an example, to describe the treating of peas in order to produce pea powder, in accord with this invention, 6 pounds of dry steel cut, hulled, granulated yellow peas having a moisture content of 12%, are placed in a closed chamber and saturated steam with a temperature of about 400° F. is admitted into the chamber to steam the peas for about 10 seconds (during which time the chamber is not tightly closed). Then the chamber is tightly closed so as to build up the steam pressure within the chamber as quickly as possible to a pressure of 200 to 210 pounds per square inch. After exposing the peas to these conditions for about 25 or 30 seconds, the chamber is suddenly opened so as to eject the peas therefrom.

They are then passed through a hot blast of air, approximately 300° F., to dry off the excess moisture.

The exploded peas, after being dried by the blast of air to about 13½% are ground through an attrition mill and are passed through a 32 mesh reel.

Following the grinding and screening which removes some moisture, the pea meal may be dried in a wheat flour dryer, for example, to about 5%. The hot dried meal is then passed through a paddle type cooler, for instance, after which it may be used in this form, or may be mixed with other ingredients such as salt, spices, flavorings, etc., to form a dry concentrated soup mix or other similar food compositions.

In the treating of peas in accord with this invention, care must be taken with reference to the temperatures, pressures, and lengths of time of exposure, in view of the fact that these conditions are rather critical with reference to yellow and green peas. Burnt and scorched characteristics develop very easily in these peas unless these conditions are carefully watched and controlled.

Following the explosion of the peas in accord with the procedures described herein, any surface moisture on the peas may be dried by air blowing, or drying procedures, as desired.

The exploded peas may then be powdered by the use of various pulverizing or powdering devices as, for example, a hammer mill or grinder. The exploded peas have developed a friability and they are much more easily powdered or pulverized than heretofore possible.

The pea powder that results has an entirely new and substantially improved water wettable quality that enables it to be mixed with water or liquids, and particularly with hot or boiling water or liquids, so as to produce substantially quickly, or even instantaneously, in many cases, a pea soup or pea puree or other pea food combination.

The unusual water wettable and water absorbent quality of the exploded pea powder is very unique and of considerable advantage in the quick preparation of foods, and in the improvement in edible characteristics.

Although the explosion treatments may be adjusted so as to produce some expansion, there is surprisingly not the substantial expansion that takes place with soya beans or chick peas and, further, the surfaces of the green and yellow peas after this explosion treatment, in many cases, seem to have an eroded or pinpricked appearance.

Although the pea, whether split or whole, green or yellow, hulled or dehulled, appears not to have changed with respect to its original shape and unity, nevertheless, its internal structure seems to be quite different. The interior, when magnified, generally has the appearance of a conglomerated mass of globules.

In the commercial utilization of the exploded pea powder of this invention, the pea powder may be sold or merchandised in its finished form, or it may be mixed with other dry ingredients or various flavoring materials so as to form a combined food to which just water or other liquid materials may be added in order to produce the finished food materials. For example, various amounts of wheat or soya flour or salt, starch, gums, sugar, pepper or various fillers or flavoring materials may be added as required.

*Example II*

Dried green split peas of the so-called "Idaho green pea" type are placed in a closed chamber and saturated steam is allowed to enter into the chamber so as to build up as quickly as possible a pressure of 215 pounds per square inch, at a temperature of about 395° F. The peas are kept in the chamber under these conditions for a period of 35 seconds and immediately thereafter the chamber is suddenly opened to the atmosphere so as to result in an instantaneous drop in pressure and ejection of the peas. (Superheated steam of about 500° F., at 215 pounds pressure, for a period of 20 seconds may be utilized.)

These exploded green peas are then powdered in a hammer mill.

The exploded green pea powder is then mixed with the following ingredients in a proportion of 100 parts exploded green pea powder, .2 part parsley powder, .06 part pepper, 1 part onion powder and 10 parts salt, so as to form a green pea soup powder combination.

A finished soup may be made with this green pea powder by placing approximately 1 ounce of the soup powder in 1 cup of hot water, milk, or the like. Thicker soups may be prepared by using more of the soup powder composition.

What is claimed is:

1. A steam exploded, expanded pea, said pea being selected from the group consisting of green and yellow peas and said pea exhibiting the quality of forming an instantly water absorbent and water wettable pea powder when said pea is powdered, the cell structure of the pea being sufficiently disrupted to produce the enhanced water absorptive property.

2. An expanded, steam exploded pea powder, said pea powder being made from a pea selected from the group consisting of green and yellow peas and said pea powder exhibiting improved water wettable and water absorbent quality, the cell structure of the pea powder being sufficiently disrupted to produce the enhanced water absorptive property.

3. The process of preparing a substantially improved water wettable and water absorbent pea selected from the group consisting of green and yellow peas, said process comprising drying the peas, subjecting them to steam at an elevated temperature and pressure for the required period of time and thereafter instantaneously releasing the temperature and pressure to a lower temperature and pressure.

4. The process of preparing a water wettable and water absorbent pea selected from the group consisting of green and yellow peas, said process comprising subjecting dried peas of this group to a steam atmosphere so as to temper the peas, then subjecting the peas to steam at an elevated temperature and pressure for the required period of time and thereafter instantaneously releasing the pressure to a lower pressure.

5. The process of preparing a water wettable and water absorbent pea selected from the group consisting of green and yellow peas, said process comprising subjecting dried peas of this group to steam at an elevated temperature and pressure for the required period of time, thereafter instantaneously releasing the pressure to a lower pressure, the steam pressure being saturated steam so as to minimize burning or scorching of the peas.

6. The process of preparing a water wettable and water absorbent pea powder, said process comprising subjecting dried peas to a steam atmosphere so as to temper the peas, then subjecting the peas to steam at an elevated pressure and temperature for the required period of time and thereafter instantaneously releasing the pressure to a lower pressure, then drying off the excess moisture from the peas, and thereafter grinding the peas, the steam being saturated steam so as to minimize scorching or burning of the peas, the peas being selected from the group consisting of green and yellow peas.

7. A steam exploded, expanded green pea, said pea exhibiting the quality of forming an instantly water absorbent and water wettable pea powder when said pea is powdered, the cell disruption of said pea being sufficient to produce the enhanced water absorptive property.

8. A steam exploded, expanded yellow pea, said pea exhibiting the quality of forming an instantly water absorbent and water wettable pea powder when said pea is powdered, the cell disruption of said pea being sufficient to produce the enhanced water absorptive property.

WILLIAM J. PLEWS.